United States Patent
Simpkins et al.

(10) Patent No.: US 6,551,734 B1
(45) Date of Patent: Apr. 22, 2003

(54) SOLID OXIDE FUEL CELL HAVING A MONOLITHIC HEAT EXCHANGER AND METHOD FOR MANAGING THERMAL ENERGY FLOW OF THE FUEL CELL

(75) Inventors: Haskell Simpkins, Grand Blanc, MI (US); Stephen M. Thomas, Laingsburg, MI (US); William J. Labarge, Bay City, MI (US)

(73) Assignee: Delphi Technologies, Inc., Troy, MI (US)

( * ) Notice: Subject to any disclaimer, the term of this patent is extended or adjusted under 35 U.S.C. 154(b) by 177 days.

(21) Appl. No.: 09/699,275

(22) Filed: Oct. 27, 2000

(51) Int. Cl.[7] .............................. H01M 8/02; H01M 8/04
(52) U.S. Cl. .............................. 429/26; 429/13; 429/30; 429/34
(58) Field of Search ..................... 429/13, 26, 30, 429/34

(56) References Cited

U.S. PATENT DOCUMENTS 4,490,445 A * 12/1984 Hsu ............................ 429/21
4,853,100 A * 8/1989 Hsu ............................ 204/256
5,338,622 A * 8/1994 Hsu et al. ..................... 429/120
5,340,664 A * 8/1994 Hartvigsen ................... 429/20
6,200,536 B1 * 3/2001 Tonkovich et al. ........ 165/167

FOREIGN PATENT DOCUMENTS

DE 199 00 166 C1 * 3/2000 ............ H01M/8/04

OTHER PUBLICATIONS

T.F. Degnan, Jr. et al. "Monolithic Reactor–Heat Exchanger", Mar. 13–15, 1978, Chemical Reaction Engineering, ACS series 65, pp. 82–97.*

* cited by examiner

Primary Examiner—Patrick Ryan
Assistant Examiner—Gregg Cantelmo
(74) Attorney, Agent, or Firm—Vincent A. Cichosz

(57) ABSTRACT

A thermal energy management system for solid oxide fuel cells includes a monolithic small cell extrusion type heat exchanger coupled to an SOFC stack. In operation, a flow of air having a selected temperature is passed through the heat exchanger cells and thermal energy flowing into and out of the SOFC stack is managed primarily by radiation coupling between the SOFC stack and the heat exchanger. The system further provides management of the temperature distribution around the SOFC to meet outer skin temperature design targets and to control the inlet gas temperatures for the SOFC. The system provides a compact, efficient method for SOFC thermal energy management and is particularly well suited for transportation applications.

20 Claims, 1 Drawing Sheet

SOLID OXIDE FUEL CELL HAVING A MONOLITHIC HEAT EXCHANGER AND METHOD FOR MANAGING THERMAL ENERGY FLOW OF THE FUEL CELL

TECHNICAL FIELD

The present invention relates to thermal energy management and more particularly relates to management of thermal energy flowing into and out of solid oxide fuel cells.

BACKGROUND OF THE INVENTION

Fuel cells are electrochemical devices that convert chemical potential energy into usable electricity and heat without combustion as an intermediate step. Fuel cells are similar to batteries in that both produce a DC current by using an electrochemical process. Two electrodes, an anode and a cathode, are separated by an electrolyte. Like batteries, fuel cells are combined into groups, called stacks, to obtain a usable voltage and power output. Unlike batteries, however, fuel cells do not release energy stored in the cell, running down when battery energy is gone. Instead, they convert the energy typically in a hydrogen-rich fuel directly into electricity and operate as long as they are supplied with fuel and oxidant. Fuel cells emit almost none of the sulfur and nitrogen compounds released by conventional combustion of gasoline or diesel fuel, and can utilize a wide variety of fuels: natural gas, coal-derived gas, landfill gas, biogas, alcohols, gasoline, or diesel fuel oil.

In transportation applications, solid oxide fuel cell (SOFC) power generation systems are expected to provide a higher level of efficiency than conventional power generators, which employ heat engines such as gas turbines, and diesel engines that are subject to Carnot cycle efficiency limits. Therefore, use of SOFC systems as power generators in vehicle applications is expected to contribute to efficient utilization of resources and to a relative decrease in the level of $CO_2$ emissions and an extremely low level of $NO_x$ emissions. However, SOFC systems suitable for use in transportation applications require a very compact size as well as efficient thermal management. Thermal management must be accomplished whereby the outer surface of the fuel cell envelope is typically maintained below 45° C. while the temperature inside the stack is about 700° C. to about 950° C. or greater.

As with fuel cells generally, very hot solid oxide fuel cells (SOFC) having high electrical conductivity are used to convert chemical potential energy in reactant gases into electrical energy. In the SOFC, two porous electrodes (anode and cathode) are bonded to an oxide ceramic electrolyte (typically, yttria stabilized zirconia, $ZrO_2$—$Y_2O_3$) disposed between them to form a selectively ionic permeable barrier. Molecular reactants cannot pass through the barrier, but oxygen ions ($O^{2-}$) diffuse through the solid oxide lattice. The electrodes are typically formed of electrically conductive metallic or semiconducting ceramic powders, plates or sheets that are porous to fuel and oxygen molecules. Manifolds are employed to supply fuel (typically hydrogen, carbon monoxide, or simple hydrocarbon) to the anode and oxygen-containing gas to the cathode. The fuel at the anode catalyst/electrolyte interface forms cations that react with oxygen ions diffusing through the solid oxide electrolyte to the anode. The oxygen-containing gas (typically air) supplied to the cathode layer converts oxygen molecules into oxygen ions at the cathode/electrolyte interface. The oxygen ions formed at the cathode diffuse, combining with the cations to generate a usable electric current and a reaction product that must be removed from the cell (i.e., fuel cell waste stream). Typical reactions taking place at the anode (fuel electrode) triple points are:

$$H_2 + \tfrac{1}{2}O^{2-} \rightarrow H_2O + 2e^-$$

$$CO + \tfrac{1}{2}O^{2-} \rightarrow CO_2 + 2e^-$$

The reaction occurring at the cathode (oxygen electrode) triple points is:

$$\tfrac{1}{2}O_2 + 2e^- \rightarrow O^{2-}$$

The overall system reactions in the cell are:

$$\tfrac{1}{2}O_2 + H_2 \rightarrow H_2O$$

$$\tfrac{1}{2}O_2 + CO \rightarrow CO_2$$

The consumption of the fuel/oxidant ions produces electrical power where the electromotive force is defined by the Nernst equation:

$$E = E^\circ + \frac{RT}{2F}\ln\left(P_{H_2} P_{O_2}^{1/2} / P_{H_2O}\right)$$

Since the SOFC fuel stacks typically operate in such a relatively high temperature range, reactant gases are preheated, typically by heat exchangers, to prevent the gases from cooling the stack below the optimum operating temperature. The heat exchangers, whether discrete or part of the total SOFC furnace, can be quite bulky, complex and expensive. In a traditional heat exchanger design, hot exhaust gas from the electrolyte plate is fed to the heat exchanger, and preheated reactant gas is received from the heat exchanger via costly insulated alloy piping. The heat exchanger and piping also require considerable installation and maintenance expense. High temperature piping and heat exchangers are costly from the standpoint of heat loss as well. The piping and heat exchanger have considerable surface area where heat may be exchanged with the atmosphere. This heat is thus unavailable to preheat incoming gases.

It is known to run planar SOFCs having limited numbers of cells in the stack in furnaces. The furnace supplies the heat necessary to bring the SOFC to operating temperature. With a limited number of cells, the surface area of the SOFC stack is large enough to dissipate the energy resulting from the exothermic reaction producing the electric power. In a one or two cell stack, the energy dissipation is such that the stack will require heat input to mitigate losses to the surrounding environment. As the number of cells increases, the effective power density per unit volume increases. The upper limit in SOFC stack size is reached at the point where the stack surface area combined with the maximum acceptable temperature delta at the stack surface is no longer capable of removing the resulting exothermic reaction energy. Acceptable temperature change is limited by the amount of thermally induced stress that the SOFC stack is capable of withstanding. Problematically, this limit is reached well before the power density required for low cost, high volume stack applications is achieved.

One approach to solving this problem is to use the SOFC cathode air to cool or heat the SOFC stack as required by the operating mode. This approach carries with it the fundamental liability of developing thermally induced stress inside the SOFC stack unless the air temperature has a limited temperature delta from the operating point of the stack. However, such a limit restricts efficiency by requiring a high volume of air to remove the thermal energy. In fact, one of the largest parasitic loads in a SOFC system is the blower used to supply the cathode air.

What is needed in the art is an improved SOFC thermal management system. What is further needed in the art is a compact, efficient SOFC thermal management system suitable for transportation applications.

SUMMARY OF THE INVENTION

The present thermal energy management system and method for controlling the thermal energy flow into and out of a SOFC comprises a monolithic ceramic heat exchanger coupled to a SOFC stack. The heat exchanger controls the energy flow into and out of the SOFC stack and manages the thermal energy produced as a byproduct of the operation of the SOFC stack. The system further provides management of the temperature distribution around the SOFC to meet outer skin temperature design targets and to control the inlet gas temperatures for the SOFC.

The heat exchanger comprises a small-cell co-extrusion monolithic type heat exchanger similar to a catalytic converter core. The heat exchanger includes an air inlet side, an air outlet side, and a plurality of cells for passing a flow of air therethrough; the heat exchanger being coupled to a SOFC stack. In operation, a flow of inlet air having a selected temperature is passed through the heat exchanger cells and thermal energy flowing into and out of the SOFC stack is managed primarily by radiation coupling between the SOFC stack and the heat exchanger.

The material used to prepare the present heat exchanger may be selected in accordance with the system requirements, with suitable materials including, but not being limited to, ceramics, zirconium phosphate, silicon nitride, aluminum nitride, molybdenum disilicide, zirconia toughened aluminum oxide, aluminum phosphate, zirconium oxide, titanium carbide, aluminum oxide, zirconium carbide, zirconium disilicide, alumino-silicates, cordierite and silicon carbide.

The present heat exchanger is operational over the entire range of temperatures generated by the SOFC (i.e., temperatures up to about 1000° C.). By using a ceramic structure as an "air-to-air" heat exchanger, several advantages are provided simultaneously. First, the present invention advantageously provides a cool skin temperature using minimum space. The present invention reduces the temperature from about 1000° C. to about 100° C. in an area of about 6 to about 10 millimeters.

Second, the present system advantageously controls the amount of heat energy removed from the cells based on the electrical power demand. This allows the cooling airflow to be modulated at low temperature using low cost hardware and further used to control the high temperature heat flow from the SOFC.

Third, the present heat exchanger functions as a pre-heater for the input fuel and oxidizer gases feeding the SOFC stack. Thus, the present system advantageously controls the temperature of the input fuel and oxidizer gases prior to their introduction into the SOFC.

These and other features and advantages of the invention will be more fully understood from the following description of certain specific embodiments of the invention taken together with the accompanying drawings.

BRIEF DESCRIPTION OF THE DRAWING

Referring now to the drawing, which is meant to be exemplary, not limiting.

DESCRIPTION OF THE PREFERRED EMBODIMENT

Figure 1:
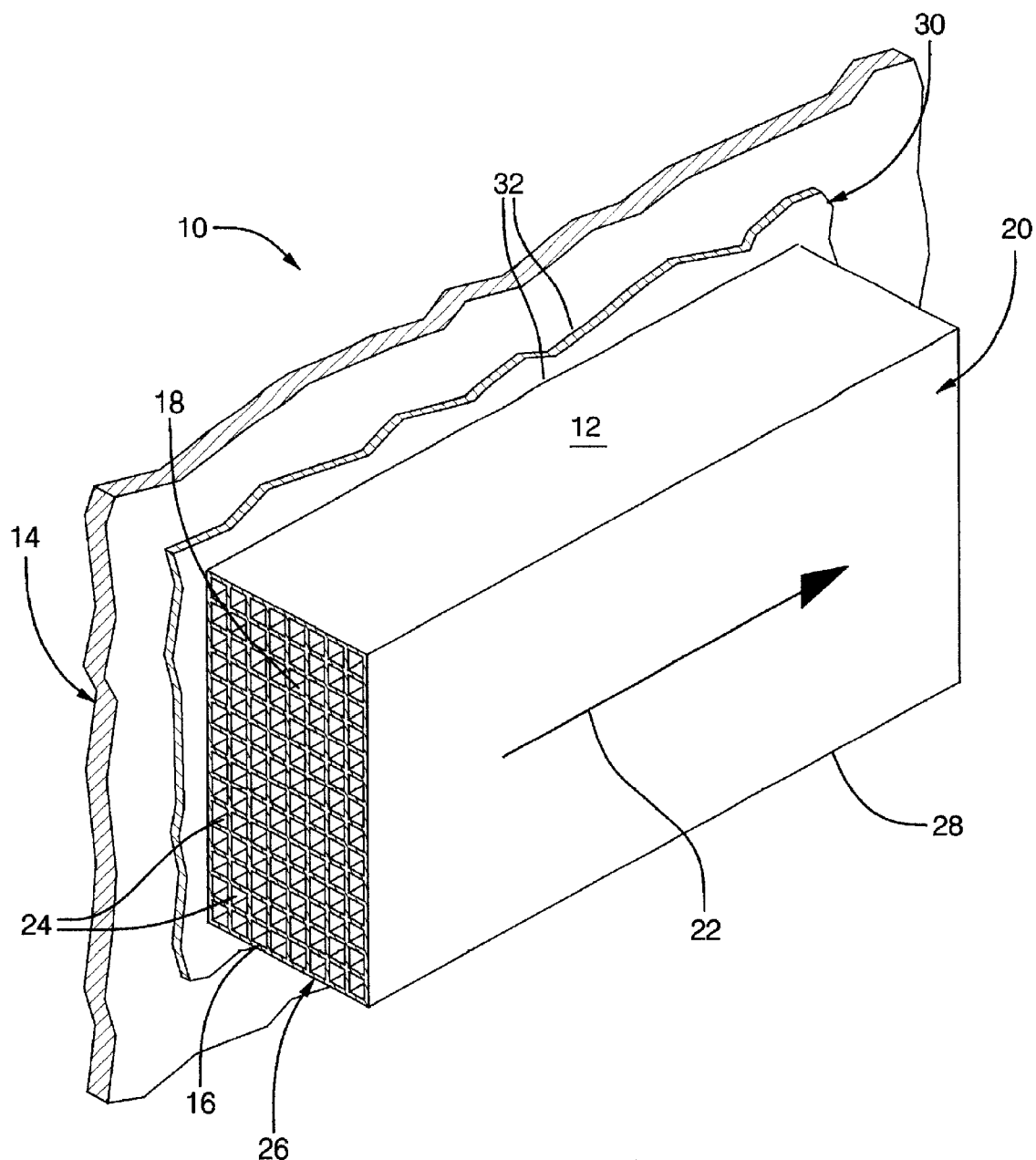
FIG. 1 provides a pictorial representation of a thermal energy management system in accordance with one possible embodiment of the present invention.

FIG. 1 provides a view of a thermal energy management system 10 in accordance with one possible embodiment of the present invention. The system 10 provides a monolithic ceramic heat exchanger 12 coupled to a SOFC stack 14 (a portion of an SOFC stack is represented by numeral 14 in FIG. 1) to manage the thermal energy produced as a byproduct of the operation of the SOFC system. A flow of gas, such as air, having a selected temperature is introduced at the inlet side 16 of the heat exchanger 12 to flow through the heat exchanger cells 18 and exit the heat exchanger 12 at the outlet end 20. In this way, the heat exchanger 12 directly heats and cools the SOFC stack 14. Preferably, the heat exchanger 12 is further employed to preheat or cool one or both the cathode and anode gas streams feeding the SOFC stack 14 (connections not shown in the FIGURE) during start/stop cycles and steady state operation.

In a most preferred embodiment, cordierite, a material currently favored as a catalytic converter substrate material, is used for construction of the heat exchanger 12 and serves to render production of the present system simple and cost effective. The material properties of cordierite make it an excellent choice for this application because the low thermal conductivity helps keep the outer ambient wall cool, and the low thermal expansion coefficient with uniform temperature gradients keeps stresses at acceptable levels. However, the construction of the present heat exchanger is not limited to cordierite. Cow materials possessing low thermal conductivity and low thermal expansion characteristics may be employed. These materials include, but are not limited to, ceramics, zirconium phosphate, silicon nitride, aluminum nitride, molybdenum disilicide, zirconia toughened aluminum oxide, aluminum phosphate, zirconium oxide, titanium carbide, aluminum oxide, zirconium carbide, zirconium disilicide, alumino-silicates, and silicon carbide.

The dominant mode of heat transfer is by radiation coupling between the SOFC stack 14 wall and the heat exchanger wall adjacent the stack 14, with radiation coupling being proportional to the SOFC wall temperature. Preferably, cooler ambient air enters the heat exchanger 12 through air inlet side 16 and travels through the cells 18 to outlet side 20 in the direction indicated by arrow 22. During normal system operation, the inlet air temperature can be as low as about 20° C. Use of ambient air having a temperature of about 20° C. enables maximum temperature differential with minimum required flows. It is undesirable to preheat the incoming air as doing so lovers the heat transfer capability of the heat exchanger 12.

In addition, the present heat exchanger 12 may be employed to heat the SOFC stack 14 at start-up using an inlet air temperature sufficient to heat the SOFC stack 14 at startup. For example, heat exchanger 12 inlet air may comprise hot air from another source such as a wall flow, catalytic combustor. If desired, a second pass may be added to ensure sufficient heat transfer to the gas. About half of the heat exchanger cells are actively involved in the heat transfer, with the remaining portion of the heat exchanger serving to keep the outer ambient wall cool.

Upon reaching SOFC operating temperature, ambient air is preferably used to remove heat from the SOFC stack 14 (with airflow in the direction indicated by the arrow 22).

Only the first few inner cells 24 are hot while the remaining cells are progressively cooler in the direction of the outer cells 26. The present heat exchanger 12 provides self-regulation of the flow with less flow in the hotter inner cells 24 and progressively greater flow in the cooler outer cells 26. For any given system pressure and SOFC wall temperature, the outer ambient heat exchanger wall 28 remains cool relative to the SOFC stack and sufficient heat transfer is maintained.

In a preferred embodiment, coupling is further controlled using a contacting material 30 disposed between the SOFC stack 14 and the heat exchanger 12. Any highly conductive material having properties that allow for expansion can be used to enhance thermal coupling, such as a thin metal wall or tightly packed metal media. A high emissivity material may also be employed for this purpose. For example, particles may be employed for this purpose, including, but not limited to, particles of silicon, silicon/boron/carbon oxide ($Si_wB_xC_yO_z$), aluminum nitride, aluminum borate, silicon nitride, boron carbide/aluminum-silicon, silicon carbide, aluminum/silicon alloy, iron/silicon alloy, boron carbide cermet with aluminum oxide, and nickel/aluminum alloy.

In an alternate embodiment, an air gap 32 is provided between the SOFC stack 14 and the heat exchanger 12 to control thermal coupling between the adjacent SOFC and heat exchanger walls. Thermal coupling is further controlled by adjusting the gap distance provided between the SOFC stack 14 and the heat exchanger 12. In another embodiment, thermal coupling is controlled using a combination of elements including a material for enhancing thermal coupling and an air gap 32, with each element being selected and adjusted in accordance with the particular system requirements.

Once the system is warmed up, no flow situations should be avoided to prevent the outer ambient wall 28 of the heat exchanger 12 from reaching undesirable temperatures. However, insulating the outer ambient wall 28 is not required, as most of the heat transfer is to the gas flow. It is preferable that airflow continues for a period after system shut down until the latent heat from the system has been removed. Typically, one to two passes through the heat exchanger 12 will suffice to achieve steady state temperature for the flowing gas.

The pressure drop for the heat exchanger 12 will be between about 2 Kpa and about 20 Kpa, dependant upon coupling and SOFC wall temperature. In an alternate embodiment, individual cell pressure control may be employed to produce equal mass flow rates per heat exchanger cell.

The present thermal energy management system comprising a ceramic based heat exchanger provides a SOFC system capable of tolerating greater amounts of thermally induced stress than previously available planar SOFC systems. Advantageously, the present thermal energy management system locates thermally induced cooling and heating stresses within the heat exchanger rather than the SOFC stack. This enables the use of a greater temperature delta between the air and SOFC structure being cooled, thereby lowering the volume of air required to remove a given amount of energy. The present thermal energy management system thus provides the further advantage of significantly reducing parasitic losses in a SOFC system.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A thermal energy management system for solid oxide fuel cells comprising:
    a monolithic heat exchanger comprising an air inlet side, an air outlet side, and a plurality of cells for passing a flow of air therethrough;
    said heat exchanger being coupled to an SOFC stack; and
    a material disposed between said SOFC stack and said heat exchanger to control thermal coupling between said SOFC stack and said heat exchanger;
    wherein in operation, a flow of inlet air having a selected temperature is passed through said heat exchanger cells and thermal energy flowing into and out of said SOFC stack is managed primarily by radiation coupling between said SOFC stack and said heat exchanger.

2. The thermal energy management system of claim 1, wherein said heat exchanger comprises ceramics, zirconium phosphate, silicon nitride, aluminum nitride, molybdenum disilicide, zirconia toughened aluminum oxide, aluminum phosphate, zirconium oxide, titanium carbide, aluminum oxide, zirconium carbide, zirconium disilicide, aluminosilicates, cordierite or silicon carbide.

3. The thermal energy management system of claim 1, wherein said heat exchanger preheats or cools one or a combination of input fuel stream and oxidizing gas stream feeding said SOFC stack.

4. The thermal energy management system of claim 1, further comprising:
    an air gap provided between said SOFC stack and said heat exchanger and configured to control thermal coupling between said SOFC stack and said heat exchanger.

5. The thermal energy management system of claim 1, further comprising:
    a material disposed between said SOFC stack and said heat exchanger to control thermal coupling between said SOFC stack and said heat exchanger; and
    an air gap disposed between said SOFC stack and said heat exchanger and configured to control thermal coupling between said SOFC stack and said heat exchanger.

6. The thermal energy management system of claim 1, wherein said material is selected from the group consisting of a high emissivity material, a metal wall, metal media, or particles selected from the group consisting of silicon, silicon/boron/carbon oxide ($Si_wB_xC_yO_z$), aluminum nitride, aluminum borate, silicon nitride, boron carbide/aluminum-silicon, silicon carbide, aluminum/silicon alloy, iron/silicon alloy, boron carbide cermet with aluminum oxide, nickel/aluminum alloy, or a combination thereof.

7. A method for managing the thermal energy flowing into and out of an SOFC system comprising:
    coupling a heat exchanger to an SOFC stack, said monolithic heat exchanger comprising an air inlet side for introducing a flow of air, a plurality of cells for passing a flow of air therethrough, and an air outlet side for discharging said flow of air;
    disposing a material between said SOFC stack and said heat exchanger and configuring said material to control thermal coupling between said SOFC stack and said heat exchanger; and
    passing said air having a selected temperature through said heat exchanger cells so as to manage thermal energy flowing into and out of said SOFC stack primarily by radiation coupling between said SOFC stack and said heat exchanger.

8. The method of claim 7, wherein said heat exchanger comprises ceramics, zirconium phosphate, silicon nitride, aluminum nitride, molybdenum disilicide, zirconia toughened aluminum oxide, aluminum phosphate, zirconium oxide, titanium carbide, aluminum oxide, zirconium carbide, zirconium disilicide, alumino-silicates, cordierite or silicon carbide.

9. The method of claim 7, further comprising:
preheating or cooling one or a combination of input fuel stream and oxidizing gas stream feeding said SOFC stack with said heat exchanger.

10. The method of claim 7, further comprising:
providing an air gap between said SOFC stack and said heat exchanger and configuring said air gap to control thermal coupling between said SOFC stack and said heat exchanger.

11. The method of claim 7, further comprising:
providing an air gap between said SOFC stack and said heat exchanger and configuring said air gap to control thermal coupling between said SOFC stack and said heat exchanger; and
disposing a material between said SOFC stack and said heat exchanger and configuring said material to control thermal coupling between said SOFC stack and said heat exchanger.

12. The method of claim 1, wherein said material is selected from the group consisting of a high emissivity material, a metal wall, metal media, or particles selected from the group consisting of silicon, silicon/boron/carbon oxide ($Si_wB_xC_yO_z$), aluminum nitride, aluminum borate, silicon nitride, boron carbide/aluminum-silicon, silicon carbide, aluminum/silicon alloy, iron/silicon alloy, boron carbide cermet with aluminum oxide, nickel/aluminum alloy, or a combination thereof.

13. A thermal energy management system for solid oxide fuel cells comprising:
an extruded ceramic monolithic heat exchanger comprising an air inlet side, an air outlet side, and a plurality of cells for passing a flow of air therethrough;
said heat exchanger being coupled to an SOFC stack; and
a material disposed between said SOFC stack and said heat exchanger to control thermal coupling between said SOFC stack and said heat exchanger;
wherein in operation, a flow of inlet air having a selected temperature is passed through said heat exchanger cells and thermal energy flowing into and out of said SOFC stack is managed primarily by radiation coupling between said SOFC stack and said heat exchanger.

14. The thermal energy management system of claim 13, further comprising:
an air gap disposed between said SOFC stack and said heat exchanger and configured to control thermal coupling between said SOFC stack and said heat exchanger.

15. The thermal energy management system of claim 13, wherein said material is selected from the group consisting of a high emissivity material, a metal wall, metal media, or particles selected from the group consisting of silicon, silicon/boron/carbon oxide ($Si_wB_xC_yO_z$), aluminum nitride, aluminum borate, silicon nitride, boron carbide/aluminum-silicon, silicon carbide, aluminum/silicon alloy, iron/silicon alloy, boron carbide cermet with aluminum oxide, nickel/aluminum alloy, or a combination thereof.

16. The thermal energy management system of claim 13, wherein said extruded ceramic heat exchanger is an extruded cordierite ceramic heat exchanger.

17. A method for managing the thermal energy flowing into and out of an SOFC system comprising:
coupling an extruded ceramic monolithic heat exchanger to an SOFC stack, said heat exchanger comprising an air inlet side for introducing a flow of air, a plurality of cells for passing a flow of air therethrough, and an air outlet side for discharging said flow of air;
disposing a material between said SOFC stack and said heat exchanger and configuring said material to control thermal coupling between said SOFC stack and said heat exchanger; and
passing said air having a selected temperature through said heat exchanger cells so as to manage thermal energy flowing into and out of said SOFC stack primarily by radiation coupling between said SOFC stack and said heat exchanger.

18. The method of claim 17, further comprising:
providing an air gap between said SOFC stack and said heat exchanger and configuring said air gap to control thermal coupling between said SOFC stack and said heat exchanger.

19. The method of claim 17, wherein said material is selected from the group consisting of a high emissivity material, a metal wall, metal media, or particles selected from the group consisting of silicon, silicon/boron/carbon oxide ($Si_wB_xC_yO_x$), aluminum nitride, aluminum borate, silicon nitride, boron carbide/aluminum-silicon, silicon carbide, aluminum/silicon alloy, iron/silicon alloy, boron carbide cermet with aluminum oxide, nickel/aluminum alloy, or a combination thereof.

20. The method of claim 17, wherein said extruded ceramic heat exchanger is an extruded cordierite ceramic heat exchanger.

* * * * *